United States Patent
Anderson

(10) Patent No.: US 7,242,927 B2
(45) Date of Patent: Jul. 10, 2007

(54) ESTABLISHING SPECIAL RELATIONSHIPS BETWEEN MOBILE DEVICES

(75) Inventor: Eric C. Anderson, Gardnerville, NV (US)

(73) Assignee: Scenera Technologies, LLC, Portsmouth, NH (US)

(*) Notice: Subject to any disclaimer, the term of this patent is extended or adjusted under 35 U.S.C. 154(b) by 175 days.

(21) Appl. No.: 10/927,326

(22) Filed: Aug. 25, 2004

(65) Prior Publication Data

US 2006/0046700 A1   Mar. 2, 2006

(51) Int. Cl.
*H04M 3/00* (2006.01)

(52) U.S. Cl. ............... 455/418; 455/419; 455/412.1; 709/219; 709/224

(58) Field of Classification Search ............... 455/418, 455/419, 420, 445, 412.1; 709/219, 224
See application file for complete search history.

(56) References Cited

U.S. PATENT DOCUMENTS

| | | | |
|---|---|---|---|
| 6,820,116 B1* | 11/2004 | Pyhalammi et al. | 709/219 |
| 6,973,299 B2* | 12/2005 | Apfel | 455/412.2 |
| 7,003,327 B1* | 2/2006 | Payne et al. | 455/566 |
| 2001/0034244 A1* | 10/2001 | Calder et al. | 455/556 |
| 2002/0098849 A1* | 7/2002 | Bloebaum et al. | 455/456 |
| 2002/0160757 A1* | 10/2002 | Shavit et al. | 455/414 |
| 2002/0165016 A1 | 11/2002 | Lee | |
| 2003/0041065 A1 | 2/2003 | Lucovsky et al. | |
| 2004/0185773 A1* | 9/2004 | Gerber et al. | 455/3.06 |
| 2004/0203746 A1* | 10/2004 | Knauerhase et al. | 455/432.1 |
| 2004/0236792 A1 | 11/2004 | Celik | |
| 2005/0003822 A1* | 1/2005 | Aholainen et al. | 455/445 |
| 2005/0044378 A1* | 2/2005 | Beard et al. | 713/182 |

FOREIGN PATENT DOCUMENTS

| | | |
|---|---|---|
| EP | 1455545 | 9/2004 |
| WO | WO 03/100646 | 12/2003 |

OTHER PUBLICATIONS

PCT Search Report for corresponding International Application No. PCT/US2005/029562 mailed Apr. 18, 2006, 3 pages.

* cited by examiner

*Primary Examiner*—Danh Le

(57) ABSTRACT

A method and system for establishing special relationships between mobile devices has been disclosed. The method and system configures a plurality of contact classes for a mobile device, where each contact class comprises associated properties, and assigning at least one contact to one of the contact classes. The communication between the mobile device and the contact is based on the associated properties for the assigned contact class. The associated properties can include messaging type, parameters for data access, parameters for access to sensitive information, and image access by quality level. Contact and access control information can then be directly exchanged between the mobile device and the contact. The contact can obtain an account with the mobile and its associated devices without needing to visit each associated device. The contact and access control information thus only needs to be entered once for each user.

44 Claims, 2 Drawing Sheets

ESTABLISHING SPECIAL RELATIONSHIPS BETWEEN MOBILE DEVICES

FIELD OF THE INVENTION

The present invention relates to mobile devices, and more particularly to the relationships between mobile devices.

BACKGROUND OF THE INVENTION

Current wireless or mobile devices that can communicate (such as wireless phones, personal digital assistants (PDA), or digital cameras) have contact lists, which may include the name, phone number, email address, and other information, for each contact on the lists. Different permissions may be assigned to each group. However, to use these features, a user has to register with the system, typically requiring the user to input on a personal computer or server. The user may have to create an account on the personal computer or server and then assign access privileges. This is cumbersome for the user.

Accordingly, there exists a need for a method and system for establishing special relationships between mobile devices. The method and system should allow communication between mobile devices to vary based upon properties associated with an assigned contact class of mobile devices without requiring the user of the devices to register with the system. The present invention addresses such a need.

SUMMARY OF THE INVENTION

A method and system for establishing special relationships between mobile devices has been disclosed. The method and system configures a plurality of contact classes for a mobile device, where each contact class comprises associated properties, and assigning at least one contact to one of the contact classes. The communication between the mobile device and the contact is based on the associated properties for the assigned contact class. The associated properties can include messaging type, parameters for data access, parameters for access to sensitive information, and image access by quality level. Contact and access control information can then be directly exchanged between the mobile device and the contact. The contact can obtain an account with the mobile device and its associated devices without needing to visit each associated device. The contact and access control information thus only needs to be entered once for each user.

DETAILED DESCRIPTION

The present invention provides a method and system for establishing special relationships between mobile devices. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
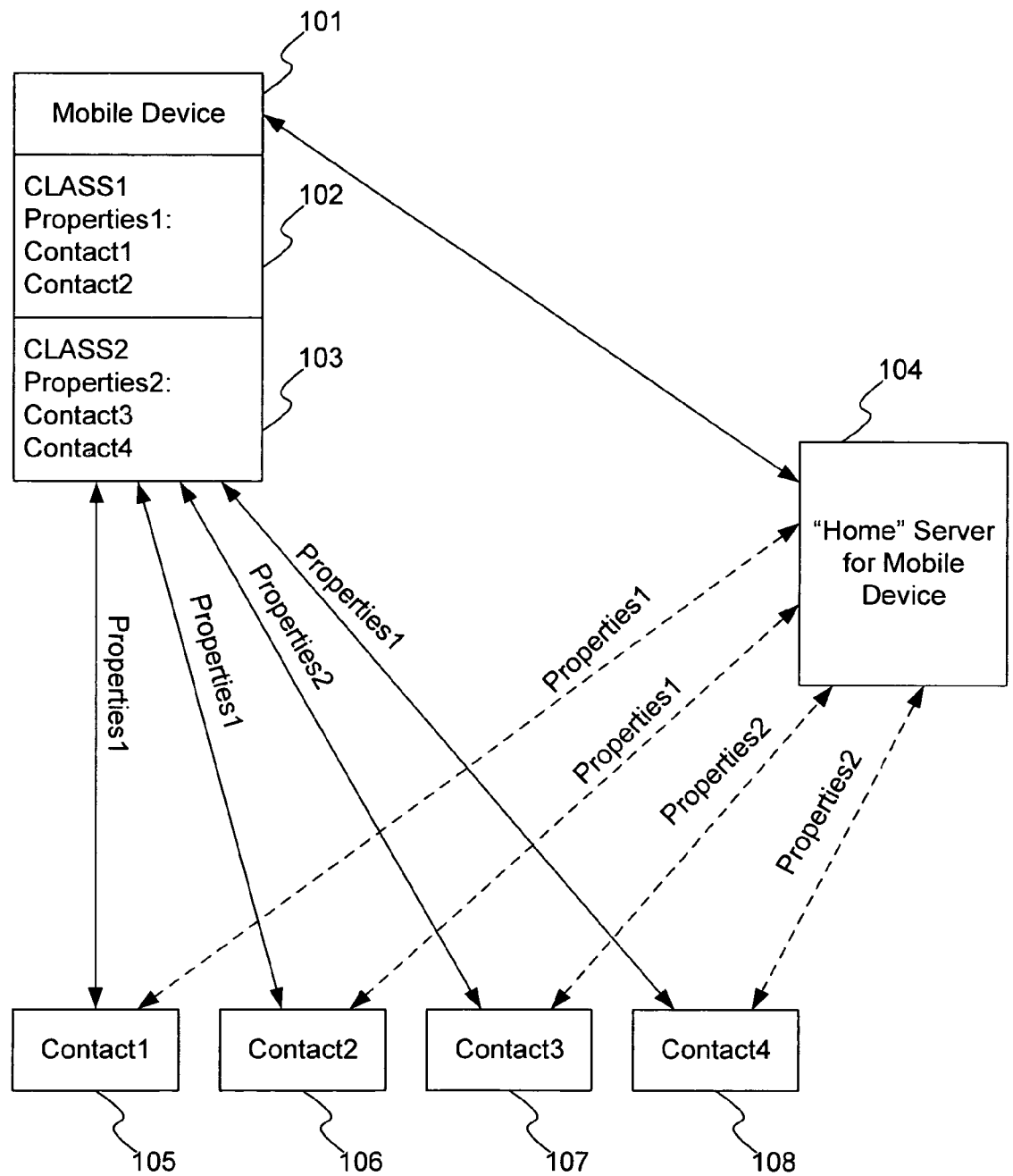
FIG. 1 illustrates a preferred embodiment of a system for establishing special relationships between mobile devices in accordance with the present invention.

FIG. 1 illustrates a preferred embodiment of a system for establishing special relationships between mobile devices in accordance with the present invention. The system includes a mobile device 101. Contact classes 102-103 are configured on the mobile device 101 with each contact class associated with various properties. Contacts 105-108 can be assigned to one or more of the contact classes. Communication between the mobile device 101 and a contact is then based upon the properties of the contact class to which the contact is assigned. If the contact accesses the mobile device's "home" server 104, i.e., the server of the mobile device's service provider, such as to view images uploaded from the mobile device 101, the nature and extent of the contact's access is determined by its contact class properties.

Figure 2:
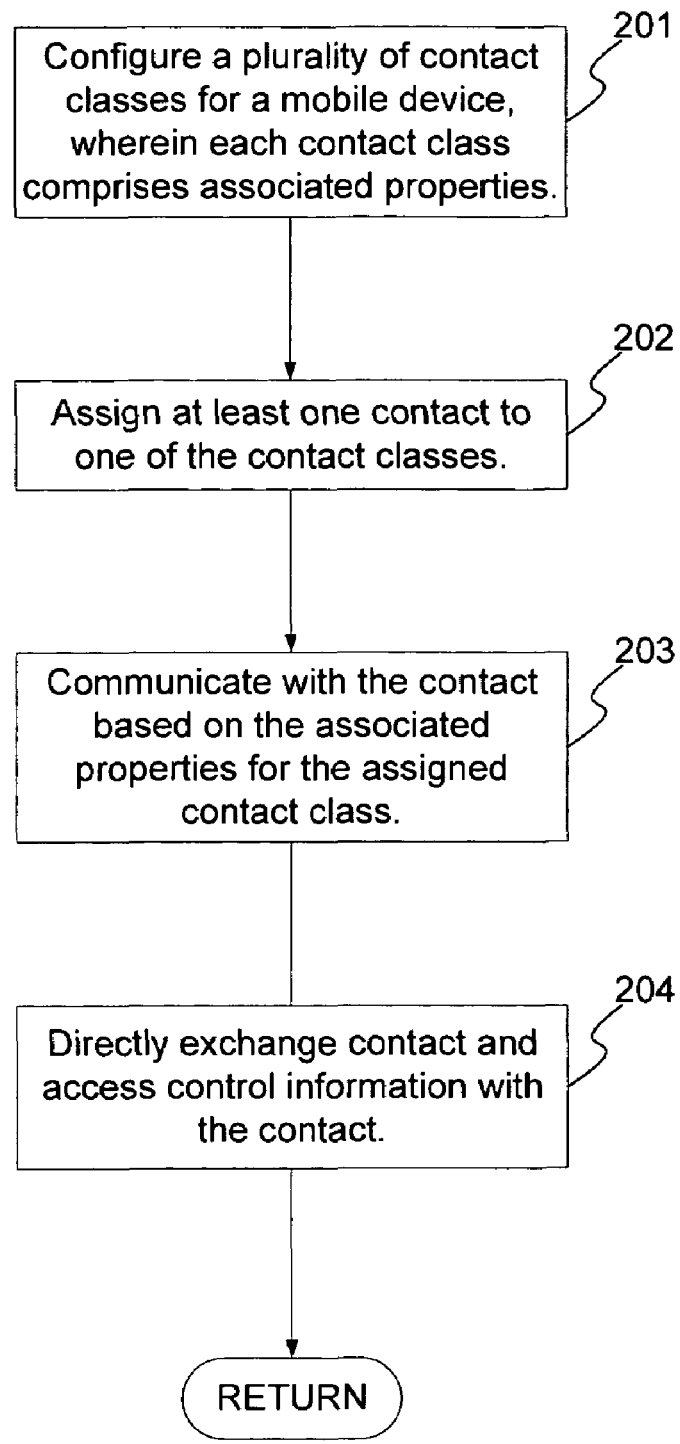
FIG. 2 is a flowchart illustrating a preferred embodiment of a method for establishing special relationships between mobile devices in accordance with the present invention.

FIG. 2 is a flowchart illustrating a preferred embodiment of a method for establishing special relationships between mobile devices in accordance with the present invention. Referring to both FIGS. 1 and 2, a plurality of contact classes for a mobile device is configured, via step 201. For example, contact classes "Class1" (102) and "Class2" (103) are configured on the mobile device 101. Sample contact classifications include "family", "relatives", "friends", "associates" (business or co-worker), or "affinity" (such as photography or sports). Any number of classifications can be established by the user of the mobile device 101. A default "starter" set can be provided. Each contact class comprises associated properties. For example, Class1 (102) is associated with Properties1, while Class2 (103) is associated with Properties2. Sample properties include: direct device-to-device messaging (off, voice, text, image, and combinations); data access (read-only, read-write, selectable folder access, such as images, presentations, etc.); sensitive access (off or on with authentication); and image access by quality level (off, VGA, XGA, full resolution).

At least one contact can then be assigned to one of the contact classes, via step 202. For example, Contact1 (105) and Contact2 (106) are assigned to Class1 (102), while Contact3 (107) and Contact4 (108) are assigned to Class2 (103). Optionally, the contact classes can be maintained without assigning any contacts to them. Communication with the contact is then based on the associated properties for the assigned contact class, via step 203. For example, communication between the mobile device 101 and Contact1 (105) or Contact2 (106) are based on Properties1 for Class1 (102). Similarly, communication between the mobile device 101 and Contact3 (107) or Contact4 (108) are based on Properties2 for Class2 (103). The communication can be between the mobile devices directly or via the server 104, such as via email (SMTP server), or the contact's own "home" server, or via a service-provider server, such as the imaging server of a cell carrier.

The mobile device 101 can then directly exchange contact and access control information with the contact, via step 204. The contact information can include full name, address, phone number, email address, etc. The access control information can include information for associated devices ("home" server, etc.). In this manner, the contact can obtain an account with the mobile device 101 and all of its associated devices without needing to visit each associated device. The contact and access control information thus only needs to be entered once for each user, significantly increasing the ease in the use of the mobile device 101 and the granting of access to other devices.

Once the contact classes are configured, the user of the mobile device 101 can assign new contacts, or remove contacts, dynamically. For example, assume that one of the contact classes is an affinity class for nature photography. For this class, the user sets the properties to allow read-only access to VGA-sized images, accept tokens, links, or notification for images available for review from anyone in the contact class, notify everyone in the contact class when "posting" new images, and allow direct messaging between devices. Based on these properties, the contacts in this contact class are thus people with whom the user shares images, but not with full resolution. The user is notified when any of the contacts in this contact class add images to their respective servers. The mobile device 101 or the imaging server also notifies the contacts in the contact class when the user adds images to his/her server 104. Messages can also be sent between the mobile device 101 and the contacts in the contact class.

Assume that the user is visiting Yosemite Park, where there is no Internet access for the mobile device 101. Only device-to-device communications, such as infrared, Bluetooth™, and perhaps Wi-Fi, are available. If the user meets someone at the campground with whom the user decides to share his/her images, the user can add this person to the contact class for nature photography. Using the device to device communication, the user and the new person exchange "business cards" to load each other's contact information. Once the contact information is received, the user can choose the nature photography affinity contact class and assign it to the new contact.

Next, the user transmits information to the new contact's device that will enable it to utilize the properties associated with the nature photography affinity contact class. This can take several different paths, depending on what level of support for contact class properties is provided in the other device. For example, a link with a password and an ID access the photos via a standard Internet browser, can be provided. An email address which will provide a way to send a message directly to the mobile device 101 can also be provided. This could also be a standard email address, where the mobile device 101 receives the user's email redirected to it when the user is not at the "home" location. Alternatively, it could be a special device address in the form of an email address, where the user's home server, or a service provider, can take a regular email and do whatever is required to deliver it to the mobile device 101. For example, 7757882323@att.mobile.net might be the direct email address for a cell phone with AT&T Wireless service with the phone number 775-882-2323. Sending to this email address will cause the message to appear directly on the cell phone.

If the new contact has the capability of supporting directly the classification information, then the information passed may include other information to identify the user as a member of the contact class. Information allowing direct connection to the user's "home" server 104 can also be passed. It may include secret keys or other mechanisms to allow a secure connection and authentication, or a standard secure socket layer (SSL) connection may be used. Authentication information may be unique, assigned to the new contact using a set previously provided by the server 104, or created and shared later with the server 104. In the preferred embodiment, a number of authentication codes are prepared by the "home" server and uploaded to the mobile device that can be shared with other mobile devices when dynamically assigning new contacts to contact classes.

To address security concerns, many different approaches can be taken to reduce potential problems. Some of these approaches includes the following:

(1) Disallow remote destructive features. For example, files, images, etc. are not allowed to be deleted remotely. Optionally, a remote "pseudo" delete can be supported, where the delete appears to the remote user to have actually happened, but the real delete must be committed by the owner, either via an authenticated transaction from his remote device 101 or a internet access terminal, or physically at the location of the server 104.

(2) Disallow access to sensitive information or files without authentication, such as a pass code or biometric identification. Authentication can be a pass code, a text password, a voiceprint (required to speak a sentence that varies each time), or a biometric (such as a fingerprint).

(3) Use a secure connection with the server 104 for transaction information and data that must be protected. This can be a standard SSL connection, or can proceed using secret keys generated by the server 104 and passed to the mobile devices as described above. The owner's mobile device 101 can pass on secret keys to new contacts as needed, from a store within the device 101. Different classes may require different levels of authentication. Basic classes might need no additional authentication, other than the owner committing transactions such as writes, changes, or deletes, if allowed. For higher security, remote authentication could require a pass code or other form of identification.

(4) Limit access to image data. One effective way is by image resolution. Full resolution images are kept away from the contacts unless they have a need for it, or if they have agreed to pay for them. The requirement for payment can be part of the properties associated with the contact class.

(5) Limit access by folder and/or file type, as part of the properties associated with the contact class.

(6) Keep data written to the system in a separate area to be committed by the owner. The remote view can be presented as if the written data was actually placed in the viewed location. This requires maintaining a list of written and deleted or changed files, and a file cache, so that changes can be presented as real to the user. The owner, however, should be able to view the real status of the data, as well as to view the non-committed status.

In the preferred embodiment, when the server 101 receives a communication from a contact in a contact class, the privileges associated with this contact class are retrieved from a class properties table at the server 101 and applied to the contact. If the class properties require notification to the owner for any given transaction, this is handled by the server 101. If a transaction requires direct on-line approval from the owner, then the transaction is suspended until approved. New contact class members, who have accessed the server 101 prior to being assigned a contact class, can be allowed temporary class status until authenticated by the owner at the next access, either remotely from the mobile device 101 or internet terminal, or locally at the server location.

A method and system for establishing special relationships between mobile devices has been disclosed. The method and system configures a plurality of contact classes for a mobile device, where each contact class comprises associated properties, and assigning at least one contact to one of the contact classes. The communication between the mobile device and the contact is based on the associated properties for the assigned contact class. the associated properties can include messaging type, parameters for data access, parameters for access to sensitive information, and image access by quality level. Contact and access control information can then be directly exchanged between the mobile device and the contact. The contact can obtain an account with the mobile device and its associated devices without needing to visit each associated device. The contact and access control information thus only needs to be entered once for each user, significantly increasing the ease in the use of the mobile device, and eliminating effort by the recipient contact, while maintaining control and security over the data on a device's server.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for establishing special relationships between mobile devices, comprising:
    configuring a plurality of contact classes for a mobile device, wherein each contact class comprises associated properties;
    assigning at least one contact to one of the contact classes, wherein communication between the mobile device and the contact is based on the associated properties for the assigned contact class; and
    directly exchanging contact and access control information with the contact;
wherein:
    the associated properties comprise parameters for data access;
    the parameters for data access allow destructive operations by the contact that require commitment by a user of the mobile device;
    the destructive operations are displayed to the contact as completed; and
    the destructive operations are not actually completed until commitment by the user of the mobile device.

2. A computer readable medium with program instructions for establishing special relationships between mobile devices, comprising the instructions for:
    configuring a plurality of contact classes for a mobile device, wherein each contact class comprises associated properties;
    assigning at least one contact to one of the contact classes, wherein communication between the mobile device and the contact is based on the associated properties for the assigned contact class;
    directly exchanging contact and access control information with the contact;
wherein:
    the associated properties comprise parameters for data access;
    the parameters for data access allow destructive operations by the contact that require commitment by a user of the mobile device;
    the destructive operations are displayed to the contact as completed; and
    the destructive operations are not actually completed until commitment by the user of the mobile device.

3. A system, comprising:
    a mobile device, comprising a plurality of contact classes, wherein each contact class comprises associated properties, wherein each contact on the list of contacts is assigned to one of the contact classes, wherein communication between the mobile device and the contact is based on the associated properties for the assigned contact class, wherein contact and access control information is directly exchanged between the mobile device and the contact; and
    a server associated with the mobile device, comprising a table, wherein the table comprises the associated properties for each contact class
wherein:
    the associated properties comprises parameters for data access;
    the parameters for data access allow destructive operations by the contact that require commitment by a user of the mobile device;
    the destructive operations are displayed to the contact as completed, and
    the destructive operations are not actually completed until commitment by the user of the mobile device.

4. A method for establishing special relationships between mobile devices, comprising:
    configuring a plurality of contact classes for a mobile device, wherein each contact class comprises associated properties and each contact class is first established based on the associated properties without associating any contacts;
    assigning at least one contact to one of the contact classes, wherein communication between the mobile device and the contact is based on the associated properties for the assigned contact class; and
    directly exchanging contact and access control information with the contact.

5. The method of claim 4, wherein the associated properties comprise a message type for a message sent to or received by the mobile device.

6. The method of claim 4, wherein the associated properties comprise parameters for data access.

7. The method of claim 6, wherein the parameters for data access allow destructive operations by the contact that require commitment by a user of the mobile device.

8. The method of claim 4, wherein the associated properties comprise parameters for access to sensitive information.

9. The method of claim 4, wherein the associated properties comprise an image access quality level.

10. The method of claim 4, wherein the communication is directly between the mobile device and the contact.

11. The method of claim 4, wherein the communication is between the contact and a home server for the mobile device.

12. The method of claim 11, wherein the home server comprises a server for the mobile device's service provider.

13. The method of claim 4, wherein the communication is secure.

14. The method of claim 4, further comprising:
    dynamically modifying the assignment of the contact by a user of the mobile device.

15. The method of claim 4, wherein the access control information comprises information for associated devices for the contact.

16. The method of claim 15, further comprising:
    obtaining an account with the mobile device and its associated devices by the contact.

17. The method of claim 16, wherein the account is obtained without the contact accessing the associated devices.

18. A computer readable medium with program instructions for establishing special relationships between mobile devices, comprising the instructions for:

configuring a plurality of contact classes for a mobile device, wherein each contact class comprises associated properties and each contact class is first established based on the associated properties without associating any contacts;

assigning at least one contact to one of the contact classes, wherein communication between the mobile device and the contact is based on the associated properties for the assigned contact class; directly exchanging contact and access control information with the contact.

19. The medium of claim 18, wherein the associated properties comprise a message type for a message sent to or received by the mobile device.

20. The medium of claim 18, wherein the associated properties comprise parameters for data access.

21. The medium of claim 20, wherein the parameters for data access allow destructive operations by the contact that require commitment by a user of the mobile device.

22. The medium of claim 18, wherein the associated properties comprise parameters for access to sensitive information.

23. The medium of claim 18, wherein the associated properties comprise an image access quality level.

24. The medium of claim 18, wherein the communication is directly between the mobile device and the contact.

25. The medium of claim 18, wherein the communication is between the contact and a home server for the mobile device.

26. The medium of claim 25, wherein the home server comprises a server for the mobile device's service provider.

27. The medium of claim 18, wherein the communication is secure.

28. The medium of claim 18, further comprising:
dynamically modifying the assignment of the contact by a user of the mobile device.

29. The medium of claim 18, wherein the access control information comprises information for associated devices for the contact.

30. The medium of claim 28, further comprising:
obtaining an account with the mobile device and its associated devices by the contact.

31. The medium of claim 30, wherein the account is obtained without the contact accessing the associated devices.

32. A system, comprising:
a mobile device, comprising a plurality of contact classes, wherein each contact class comprises associated properties and each contact class is first established based on the associated properties without associating any contacts, wherein each contact on the list of contacts is assigned to one of the contact classes, wherein communication between the mobile device and the contact is based on the associated properties for the assigned contact class, wherein contact and access control information is directly exchanged between the mobile device and the contact; and a server associated with the mobile device, comprising a table, wherein the table comprises the associated properties for each contact class.

33. The system of claim 32, wherein the associated properties comprise a message type for a message sent to or received by the mobile device.

34. The system of claim 32, wherein the associated properties comprises parameters for data access.

35. The system of claim 34, wherein the parameters for data access allow destructive operations by the contact that require commitment by a user of the mobile device.

36. The system of claim 34, wherein the associated properties comprises parameters for access to sensitive information.

37. The system of claim 34, wherein the associated properties comprise an image access quality level.

38. The system of claim 34, wherein the communication is directly between the mobile device and the contact.

39. The system of claim 34, wherein the communication is between the contact and the server.

40. The system of claim 39, wherein the server comprises a server for the mobile device's service provider.

41. The system of claim 34, wherein the communication is secure.

42. The system of claim 34, wherein the access control information comprises information for associated devices for the contact.

43. The system of claim 34, wherein the contact obtains an account with the mobile device and its associated devices by the contact.

44. The system of claim 43, wherein the account is obtained without the contact accessing the associated devices.

* * * * *